US005688156A

United States Patent [19]
Hildebrandt et al.

[11] Patent Number: 5,688,156
[45] Date of Patent: Nov. 18, 1997

[54] SHEET FOR PRODUCING PLASTIC FILMS AND A PROCESS FOR PRODUCING THIS SHEET

[75] Inventors: Gustav Hildebrandt, Auetal; Horst Büscher, Langenhagen; Dirk Leiss, Grossburgwedel; Reiner Taczkowski, Hanover; Hans-Hinrich Kruse, Barsinghausen, all of Germany

[73] Assignee: Benecke-Kaliko AG, Hanover, Germany

[21] Appl. No.: 496,603

[22] Filed: Jun. 29, 1995

[30] Foreign Application Priority Data

Jun. 30, 1994 [DE] Germany .................. 44 22 871.6

[51] Int. Cl.$^6$ ........................................ B32B 3/00
[52] U.S. Cl. ................ 442/180; 428/156; 428/172
[58] Field of Search .................... 428/251, 268, 428/285, 241, 156, 171, 172; 442/180

[56] References Cited

U.S. PATENT DOCUMENTS

| | | | |
|---|---|---|---|
| 3,142,715 | 7/1964 | Burk | 264/213 |
| 3,190,947 | 6/1965 | Norcross | 264/216 |
| 3,575,754 | 4/1971 | Duerden et al. | 156/79 |
| 3,924,040 | 12/1975 | Addie et al. | 428/234 X |
| 4,473,609 | 9/1984 | Caldwell | 428/247 X |
| 4,746,565 | 5/1988 | Bafford et al. | 428/251 |
| 4,833,005 | 5/1989 | Klaar et al. | 428/251 X |

FOREIGN PATENT DOCUMENTS

| | | |
|---|---|---|
| 262594 | 6/1968 | Austria . |
| 1214389 | 4/1966 | Germany . |
| 1504684 | 4/1969 | Germany . |

*Primary Examiner*—Daniel Zirker
*Attorney, Agent, or Firm*—Banner & Witcoff, Ltd.

[57] ABSTRACT

This invention concerns a sheet for producing plastic films with a tear-resistant layer and a plastic layer that is applied to the former and has a surface that faces away from the tear-resistant layer and is suitable for applying liquid or pasty plastics for the plastic film to be produced. The surface of the layer of plastic which is preferably a negative of a relief pattern consists of polypropylene. The sheet permits a high fidelity in reproduction of the relief pattern plus a long lifetime as well. The sheet may be relatively thin, so a great length can be wound up on a roll. Therefore, great lengths of a plastic film can be produced in one piece by casting or spreading liquid plastic on the sheet. Therefore, the conversion time required for the manufacturing installation is short, which has a positive effect on the price of the product.

18 Claims, No Drawings

SHEET FOR PRODUCING PLASTIC FILMS AND A PROCESS FOR PRODUCING THIS SHEET

BACKGROUND OF THE INVENTION

This invention concerns a sheet of the type defined in the generic portion of claim 1. This invention also concerns a process for producing such a sheet.

It is known that a plastic film can be produced by applying a thin layer of a liquid or pasty plastic to a substrate, then curing the plastic and next pulling away the layer in the form of a film. This is usually accomplished in a continuous process, where the substrate is a continuous or even a finite backing sheet that has either a smooth surface or an embossed relief pattern.

A known sheet of this type is made of paper embossed with a relief pattern that extends to the back side of the paper, so the cross section shows a corrugated fine structure that corresponds to the embossed pattern. To improve the surface properties, especially in order to facilitate separation of the plastic compound applied or spread on the paper subsequently as a film, the embossed paper is provided with a thin layer of plastic after embossing.

This known sheeting is simple and therefore inexpensive to manufacture, but it has several disadvantages. One disadvantage is that it has a low resistance to tearing. In practice, tears develop quickly, especially at the edges, and can lead to rejects in the production of the plastic sheeting and can even lead to tearing of the sheet itself, which causes interruptions in production and, if repairs are made, this leads to discontinuities in the relief pattern, so the repair is visible.

Another disadvantage of this known sheet is that only a shallow relief pattern, such as a grain, can be embossed, so this permits only incomplete reproduction of the desired relief pattern. In addition, another disadvantage is that the force required to separate the sheet from the backing increases as the sheet is used repeatedly, so each sheet has only a limited lifetime. The number of repeated uses of this known sheet is therefore low, so despite the low manufacturing cost of this sheet, the total cost of the plastic film produced with this sheeting is further increased, so the advantage of the low price of the sheeting is lost.

Another disadvantage of this known and widely used sheeting consists of its low dimensional stability and its ability to absorb moisture, which has a negative effect on its strength, dimensional stability and handling in practice.

Austrian patent 262,594 discloses a sheet of the respective type that has a tear-resistant layer consisting of a fabric, for example, to which a layer of polysiloxane rubber with a relief pattern embossed on the surface is applied on one side. The polysiloxane rubber (silicone rubber) permits an accurate reproduction of a fine surface structure, such as a leather grain, but this sheeting has several disadvantages. One disadvantage is that the price is much higher—for example, 10 times higher—than the price of the paper sheeting described above. That does not compensate for the advantage that the lifetime of such silicone sheeting is approximately four times longer than that of the paper sheeting described above. In addition, the polysiloxane rubber layer is relatively thick due to the production process. Therefore, there are disadvantages in production when such sheeting is used in the form of finite sheets in production rather than continuous sheeting. The sheeting is unwound from a large roll, passes through the casting and curing line and then is rolled up again after removing the plastic film produced in this process. This yields relatively large rolls or short lengths of sheeting that lead to frequent interruptions in the manufacturing process.

An older unpublished German patent application P 43 22 140.8 discloses a plastic film based on polymers of propylene and ethylene which may optionally also contain processing aids, fillers, pigments or other additives. It contains a) a homopolymer of propylene with an MFI (230° C./2.16 kg) of about 0.8 to 3.0 g/10 min, a melting point $T_m$, of about 154° to 168° C. (determined by DSC) and an elastic modulus of about 900 to 1500 N/mm$^2$ (determined according to DIN 53,457) and b) a homopolymer of ethylene with an MFI (190° C./2.16 kg) of about 1.5 to 3.0 g/10 min, a melting point $T_M$, of about 110° to 130° C. and an elastic modulus of about 200 to 400 N/mm$^2$. However, this plastic film is not directly suitable for production of plastic films by applying a liquid or pasty plastic.

SUMMARY OF THE INVENTION

The object of this invention is to create sheeting of the proper type for producing plastic films with a surface having a very fine structure and a high fidelity of reproduction. The sheeting should also be inexpensive and easy to handle and should permit long production times.

The object of this invention is achieved by a sheeting consisting of a tear-resistant layer with a plastic layer bonded to it, where the surface of the plastic layer facing away from the tear-resistant layer is suitable for applying liquid or pasty plastics for the plastic film to be produced, wherein the plastic layer with the surface consists at least partially of polypropylene.

DETAILED DESCRIPTION OF THE INVENTION

The basic idea on which this invention is based consists of using a plastic that contains polypropylene for the surface layer instead of using the known polysiloxane rubber. It has surprisingly been found that the contours of the surface, regardless of whether the surface is smooth or has the desired relief pattern according to another embodiment of this invention, can be reproduced with good fidelity, even if the thickness of the layer of the plastic is small, or at any rate much smaller than the thickness of the layer of polysiloxane rubber with the known sheeting. In addition, the lifetime of the sheeting according to this invention is much longer, amounting to about three times that of the known polysiloxane rubber sheeting and about fifteen times that of the known paper sheeting.

Other advantages consist of its high dimensional stability and its stability in the presence of aqueous solutions, plus the fact that the layer of plastic can be extremely thin. Therefore, a much greater length can be wound onto a roll of this sheeting. This in turn yields much longer running times in production of such plastic sheeting and the equipment need not be retooled as frequently, which has a positive effect on the final price of the finished plastic film. The polypropylene layer has a non-stick effect, so no additional parting compounds are necessary to be able to pull a fully cured plastic film away from the sheeting according to this invention. The sheeting according to this invention also has a high mechanical strength, especially with respect to tears at the sides, which occur after a very short period of time with the known paper sheeting. Finally, an advantage of the sheeting according to this invention is that unlike the known polysiloxane rubber sheeting, the surface of this sheeting, especially a relief pattern in the surface, can be renewed very easily by embossing it again with heat thanks to the thermoplastic workability of the plastic.

According to one embodiment of this invention, the tear-resistant layer of the sheeting is made of a fabric, and it is especially expedient to use glass fiber weave.

According to another embodiment of this invention, the plastic also contains talc as a filler. This improves both the dimensional stability and the lifetime of the polypropylene as well as the relief pattern embossed in the plastic.

Finally, another embodiment of this invention consists of the fact that the plastic contains some polyethylene in addition to the polypropylene, where the amount of polyethylene is preferably about 20% by weight.

Another object of this invention is to create a process for producing sheeting of the type consisting of a tear-resistant layer with a plastic layer bonded to it, where the surface of the plastic layer facing away from the tear-resistant layer is suitable or applying liquid or pasty plastics for the plastic film to be produced, wherein the plastic layer with the surface consists at least partially of polypropylene. It consists of the fact that a layer of polypropylene is applied to a tear-resistant sheeting. This of course includes the fact that the layer of polypropylene may be applied in the form of a film, for example, to the tear-resistant sheeting. The polypropylene layer is then heated to the softening point, the free surface of this layer is then embossed by means of an embossing roll having a positive image of the desired relief pattern in its peripheral surface, after which the polypropylene layer or the entire sheeting is cooled, so then the relief pattern is permanently embossed in the surface of the polypropylene layer. It is especially advantageous if the polypropylene layer is heated to the melting point. This layer is then capable of penetrating into fine structures of a relief pattern and reproducing it faithfully, which is especially important when the model pattern is leather or a similar material.

An embossing roll with an embossing surface made of steel or preferably polysiloxane rubber may be used to emboss the softened or molten surface. It is also expedient to provide the polypropylene layer with a primer before bonding it to the tear-resistant sheeting.

If the plastic layer contains polyethylene in addition to polypropylene, it preferably contains a) a homopolymer of propylene with an MFI (230° C./2.16 kg) of about 0.8 to 3.0 g/10 min, a melting point $T_m$ of about 154°–168° C. (determined by DSC) and an elastic modulus of about 900 to 1500 N/mm$^2$ (determined according to DIN 53,457), and b) a homopolymer of ethylene with an MFI (190° C./2.16 kg) of about 1.5 to 3.0 g/10 min, a melting point $T_m$ of about 110°–130° C. and an elastic modulus of about 200 to 400 N/mm$^2$, where the resulting ratio is approximately 5 to 20 parts by weight of the ethylene homopolymer to about 100 parts by weight of the propylene homopolymer.

The abbreviation DSC refers to "differential scanning calorimetry" and is described in detail in Marti et al., *Applied Chemical Thermdynamics and Thermal Analysis* (Experimental Suppl. 37), Basel, Birkhäuser, 1979.

A special embodiment of this plastic with regard to the physical values given above contains a homopolymer of propylene with an MFI (230° C./2.16 Kg) of about 1 to 2 g/10 min, a melting point $T_m$ of about 158°–164° C. and an elastic modulus of about 1100 to 1300 N/mm$^2$, especially in the form of a CR product, and a homopolymer of ethylene with an MFI (190° C./2.16 kg) of about 1 to 2 g/10 min, a melting point $T_m$ of about 110° to 120° C. and an elastic modulus of about 250 to 350 N/mm$^2$.

The homopolymer of propylene preferably has a narrow molecular weight distribution. Such products are available commercially as CR products (CR=controlled rheology). An especially suitable homopolymer of ethylene is a linear low-density ethylene homopolymer (LLDPE) or a low-density polyethylene produced under low pressure (LDPE). The term "homopolymer" means that this polymer consists essentially of ethylene or propylene, respectively. In no case does this refer to a copolymer. Small amounts of other monomers may thus be included. In general, the term homopolymer in the sense of the present invention would also include a polymer that contains up to about 10 mol % of one or more comonomers, especially in the form of isoprene, 1,3-butadiene, ethylene (in the case of a homopolymer of propylene), butene, hexene and octene or the isomers thereof, in addition to ethylene or propylene.

The properties of the plastic forming the surface may be modified through the use of additives that are incorporated into the thermoplastic. Thus, for example, fillers such as metal oxides, metal carbonates, especially calcium carbonates and dolomite, metal dioxides and metal hydroxides, lubricants such as $C_{12}$–$C_{16}$ fatty acids, fatty alcohols, fatty acid esters and amides, coloring agents in the form of pigments such as titanium dioxide or carbon black and organic pigments, stabilizers such as antioxidants and heat stabilizers such as sterically hindered phenols, hydroquinones, substituted representatives of this group and mixtures thereof, UV stabilizers such as various substituted resorcinols, salicylates, benzotriazoles and benzophenones as well as other conventional modifiers may also be used. Other suitable additives include processing aids such as high-molecular acrylates or acrylate copolymers. They control the flow properties of the melting process during processing.

Another especially advantageous embodiment of the plastic surface would also contain an ethylene-propylene copolymer, with about 5 to 40 parts by weight, especially about 10 to 25 parts by weight ethylene-propylene copolymer to 100 parts by weight propylene homopolymer. It is preferable here for the ethylene-propylene copolymer to have an MFI (230° C./2.16 kg) of about 1 to 4 g/10 min, a melting point $T_m$ of about 140° to 155° C. and an elastic modulus of about 400 to 700 N/mm$^2$.

We claim:

1. Substantially continous sheet for producing plastic films, consisting of a tear-resistant layer with a plastic layer bonded to it, where the surface of the plastic layer facing away from the tear-resistant layer is suitable for applying liquid or pasty plastics for the plastic film to be produced has a structure which is a negative of the structure of the plastic film to be produced, and the improvement wherein the plastic layer with the surface consists at least partially of polypropylene.

2. Sheet according to claim 1, wherein the surface for producing plastic film has a relief pattern thereon and is itself a negative of said pattern.

3. Sheet according to claim 1, wherein the tear-resistant layer of the sheet is made of glass fiber.

4. Sheet according to claim 1, wherein the polypropylene layer also contains talc.

5. Sheet according to claim 1, wherein the polypropylene layer also contains polyethylene.

6. Sheet according to claim 5, wherein the amount of polyethylene in the polypropylene is about 20% by weight.

7. Sheet according to claim 5, wherein the plastic of the layer with the surface is formed by polymerization of propylene and ethylene and optionally (contains) comprises processing aids, fillers, pigments or other additives, where the plastic contains a) a homopolymer of propylene with an MFI (230° C./2.16 kg) of about 0.8 to 3.0 g/10 min, a melting point $T_m$ of about 154°–168° C. (determined by DSC) and an elastic modulus of about 900 to 1500 N/mm² (determined according to DIN 53,457), and b) a homopolymer of ethylene with an MFI (190° C./2.16 kg) of about 1.5 to 3.0 g/10 min, a melting point $T_m$ of about 110°–130° C. and an elastic modulus of about 200 to 400 N/mm², where the resulting ratio is approximately 5 to 20 parts by weight of the homopolymer of ethylene to about 100 parts by weight homopolymer of propylene.

8. Sheet according to claim 7, wherein the plastic comprises a) a homopolymer of propylene with an MFI (230° C./2.16 kg) of about 1 to 2 g/10 min, a melting point $T_m$, of about 158°–164° C. and an elastic modulus of about 1100 to 1300 N/mm², and b) a homopolymer of ethylene with an MFI (190° C./2.16 kg) of about 1 to 2 g/10 min, a melting point $T_m$, of about 110° to 120° C. and an elastic modulus of about 250 to 350 N/mm².

9. Sheet according to claim 7, wherein the plastic is a low-density homopolymer of ethylene with a linear structure (LLDPE) and/a low-density high-pressure polyethylene (LDPE).

10. Sheet according to claim 8, wherein the plastic is a low-density homopolymer of ethylene with a linear structure (LLDPE) and/a low-density high-pressure polyethylene (LDPE).

11. Sheet according to claim 8, wherein approximately 8 to 12 parts by weight polyethylene homopolymer are obtained per approximately 100 parts by weight of propylene homopolymer.

12. Sheet according to claim 7, wherein the plastic is a a low-density high-pressure polyethylene (LDPE).

13. Sheet according to claim 5, wherein the plastic also contains an ethylene-propylene copolymer, which consists of approximately 5 to 40 parts by weight ethylene-propylene copolymer per 100 parts by weight propylene homopolymer.

14. Sheet according to claim 7, wherein the ethylene-propylene copolymer has an MFI (230° C./2.16 kg) of about 1 to 4 g/10 min, a melting point $T_m$ of about 140° to 155° C. and an elastic modulus of about 400 to 700 N/mm².

15. Sheet according to claim 14, wherein the ethylene-propylene copolymer has an MFI (230° C./2.16 kg) of about 1.2 to 2.0 g/10 min, a melting point $T_m$ of about 142° to 150° C. and an elastic modulus of about 500 to 600 N/mm².

16. Sheet according to claim 8, wherein the ethylene-propylene copolymer has an MFI (230° C./2.16 kg) of about 1 to 4 g/10 min, a melting point $T_m$ of about 140° to 155° C. and an elastic modulus of about 400 to 700 N/mm².

17. Sheet according to claim 13, wherein the ethylene-propylene copolymer has an MFI (230° C./2.16 kg) of about 1 to 4 g/10 min, a melting point $T_m$ of about 140° to 155° C. and an elastic modulus of about 400 to 700 N/mm².

18. A sheet as claimed in claim 13 wherein the ethylene-propylene copolymer consists of approximately 10 to 25 parts by weight per 100 parts by weight propylene homopolymer.

* * * * *